United States Patent
Guo et al.

(10) Patent No.: US 11,092,848 B2
(45) Date of Patent: Aug. 17, 2021

(54) BACKLIGHT MODULE FRAME, BACKLIGHT MODULE, DISPLAY MODULE, AND DISPLAY DEVICE

(71) Applicants: Beijing BOE Display Technology Co., Ltd., Beijing (CN); BOE Technology Group Co., Ltd., Beijing (CN)

(72) Inventors: Junjie Guo, Beijing (CN); Xibin Shao, Beijing (CN); Yanping Liao, Beijing (CN); Zhihua Sun, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/767,148

(22) PCT Filed: Sep. 18, 2019

(86) PCT No.: PCT/CN2019/106513
§ 371 (c)(1),
(2) Date: May 27, 2020

(87) PCT Pub. No.: WO2020/057568
PCT Pub. Date: Mar. 26, 2020

(65) Prior Publication Data
US 2020/0387032 A1   Dec. 10, 2020

(30) Foreign Application Priority Data
Sep. 18, 2018 (CN) .......................... 201811089461.5

(51) Int. Cl.
*G02F 1/133* (2006.01)
*G02F 1/13357* (2006.01)
(Continued)

(52) U.S. Cl.
CPC ..... *G02F 1/133608* (2013.01); *G02B 6/0088* (2013.01); *G02F 1/133308* (2013.01);
(Continued)

(58) Field of Classification Search
CPC ......... G02F 1/133608; G02F 1/133308; G02F 2001/133317
(Continued)

(56) References Cited

U.S. PATENT DOCUMENTS

| 2005/0088809 A1* | 4/2005 | Nakagawa | ........ G02F 1/133308 361/679.21 |
| 2007/0157487 A1* | 7/2007 | Hyun | ................ G02F 1/133308 36/118.9 |

(Continued)

FOREIGN PATENT DOCUMENTS

| CN | 102566105 A | 7/2012 |
| CN | 104235698 A | 12/2014 |

(Continued)

OTHER PUBLICATIONS

International search report of PCT application No. PCT/CN2019/106513 dated Dec. 18, 2019.

*Primary Examiner* — Christopher M Raabe
(74) *Attorney, Agent, or Firm* — Fay Sharpe LLP

(57) ABSTRACT

The disclosure provides a backlight module frame, a backlight module, a display module and a display device. The backlight module frame includes: a middle frame and a fixing member. The middle frame is a hollow frame, and a display panel support stand is disposed on the inner side of the middle frame. The display panel support stand is configured to support a first display panel. The fixing member and the middle frame are detachably connected. When the fixing member is connected to the middle frame, a display panel receiving slot is formed among the display panel
(Continued)

support stand, the fixing member and the middle frame. During the transportation of the first display panel, the backlight module frame provided by the present disclosure can protect the first display panel, thereby preventing the display panel from being scratched, and ensuring the display effect of the display device.

17 Claims, 11 Drawing Sheets

(51) Int. Cl.
  *F21V 8/00* (2006.01)
  *G02F 1/1333* (2006.01)
(52) U.S. Cl.
  CPC .. *G02F 1/133317* (2021.01); *G02F 1/133322* (2021.01); *G02F 1/133325* (2021.01)
(58) Field of Classification Search
  USPC ........................................................ 362/97.1
  See application file for complete search history.

(56) References Cited

U.S. PATENT DOCUMENTS

| | | | |
|---|---|---|---|
| 2011/0051033 A1* | 3/2011 | Shimizu | G02F 1/133308 349/58 |
| 2012/0014094 A1* | 1/2012 | Yu | G02F 1/133608 362/97.2 |
| 2012/0099253 A1* | 4/2012 | Tang | H04M 1/0266 361/679.01 |
| 2013/0242225 A1 | 9/2013 | Yu | |
| 2014/0133162 A1* | 5/2014 | Chen | G02F 1/133308 362/362 |
| 2014/0285746 A1* | 9/2014 | Huang | G02F 1/133608 349/58 |
| 2016/0091656 A1 | 3/2016 | Que | |
| 2019/0073942 A1* | 3/2019 | Ma | G02F 1/133308 |

FOREIGN PATENT DOCUMENTS

| | | |
|---|---|---|
| CN | 104808359 A | 7/2015 |
| CN | 208654503 U | 3/2019 |
| JP | 2004258291 A | 9/2004 |

* cited by examiner

BACKLIGHT MODULE FRAME, BACKLIGHT MODULE, DISPLAY MODULE, AND DISPLAY DEVICE

The present disclosure is a 371 of PCT Application No. PCT/CN2019/106513, filed Sep. 18, 2018, which claims priority to Chinese Patent Application No. 201811089461.5, filed on Sep. 18, 2018 and titled "BACKLIGHT MODULE, DISPLAY MODULE AND DISPLAY DEVICE", the entire contents of which are incorporated herein by reference.

TECHNICAL FIELD

The present disclosure relates to the field of display technology, and more particularly to a backlight module frame, a backlight module, a display module, and a display device.

BACKGROUND

The display panel in a liquid crystal display device needs to use the light source provided by a backlight module to display a picture. In order to achieve a high dynamic contrast of the liquid crystal display device, a double-layer display panel is usually disposed in the liquid crystal display device.

In related art, panel manufacturers usually bond two display panels and sell to downstream manufacturers. The downstream manufacturers may assemble the double-layer display panel and the backlight module to obtain the liquid crystal display device.

SUMMARY

Embodiments of the present disclosure provides a backlight module frame, a backlight module, a display module, and a display device.

At least one embodiment of the present disclosure provides a backlight module frame. The backlight module frame includes: a middle frame and a fixing member; wherein the middle frame is a hollow frame, a display panel support stand is disposed at the inner side of the middle frame, and the display panel support stand is configured to support a first display panel;

each fixing member is connected to the middle frame, and a display panel receiving slot is formed among the display panel support stand, the fixing member, and the middle frame.

Optionally, the fixing member includes a first fixing portion and a second fixing portion connected to each other, and the fixing member is connected to the middle frame by the first fixing portion; and the fixing member forms the display panel receiving slot with the display panel support stand by the second fixing portion.

Optionally, the first fixing portion is a plate-like structure, and the first fixing portion is connected to the outer side of the middle frame.

Optionally, the first fixing portion is provided with a through hole, and the first fixing portion is fixed to the middle frame by the through hole.

Optionally, a protrusion structure is disposed on the outer side of the middle frame, and the protrusion structure is clamped inside the through hole of the first fixing portion.

Optionally, a threaded hole is disposed in the outer side of the middle frame, the threaded hole in the middle frame and the through hole in the first fixing portion are in one-to-one correspondence, and the first fixing portion is fixed on the middle frame by a bolt.

Optionally, the first fixing portion and the middle frame are adhesively fixed.

Optionally, the first fixing portion is a clamping leg, and the clamping leg is connected to the middle frame in a clamping manner.

Optionally, the upper end surface of at least one frame edge of the middle frame is provided with a clamping slot, and the clamping leg is clamped in the clamping slot;

wherein the upper end surface of the middle frame is a surface of the middle frame in contact with the second fixing portion.

Optionally, the width of the top portion of the clamping slot is smaller than the width of the bottom portion;

the width of the top portion and the width of the bottom portion of the clamping leg are both smaller than the width of the middle portion;

wherein, the top portion is close to the upper end surface with respect to the bottom portion, the width direction of the clamping slot is perpendicular to the extending direction of a frame edge where the clamping slot is located, and the width direction of the clamping leg is parallel to the width direction of the clamping slot.

Optionally, the fixing member includes two first fixing portions and the two first fixing portions are disposed at an interval.

Optionally, the first fixing portion includes a first fixing piece and a second fixing piece which are oppositely disposed;

the distance between the first fixing piece and the second fixing piece increases at first and then decreases along a first direction, the first direction is from a first end to a second end of the first fixing portion, the first end is an end of the first fixing portion in contact with the second fixing portion, and the second end is another end of the first fixing portion.

Optionally, the second fixing portion is a plate-like structure, and the second fixing portion and the display panel support stand are disposed in parallel.

Optionally, a bonding structure is disposed on the display panel support stand, and the bonding structure is located on a surface of the display panel support stand facing the second fixing portion.

Optionally, the backlight module frame includes: a plurality of fixing members, and the plurality of fixing members are disposed on the middle frame in a surrounding manner.

Optionally, the fixing member is made of an injection-molded material or a stainless-steel metal material.

At least one embodiment of the present disclosure provides a backlight module. The backlight module includes the backlight module frame according to any one of the above mentioned;

the backlight module further includes: a back plate, a light guide plate, an optical film, and a light source;

the light source, the light guide plate, and the optical film are all disposed on the back plate, and are all located on a side of the display panel support stand of the middle frame facing away from the display panel receiving slot.

At least one embodiment of the present disclosure provides a display module. The display module includes a first display panel and the backlight module according to the above mentioned, wherein the backlight module includes a middle frame and a fixing member; and the first display panel is disposed in a display panel receiving slot between the display panel support stand and the fixing member.

At least one embodiment of the present disclosure provides a display device. The display device includes: a second display panel and the display module according to the above mentioned; wherein the second display panel is disposed on a side of the first display panel away from the backlight module.

DETAILED DESCRIPTION

The present disclosure will be described in further detail with reference to the accompanying drawings, to present the objects, technical solutions, and advantages of the present disclosure more clearly.

In the related art, since no backlight module provides protection for the double-layer display panel, the display panel is easily scratched in the process of carrying the double-layer display panel, which affects the display effect of the liquid crystal display device.

Figure 1:
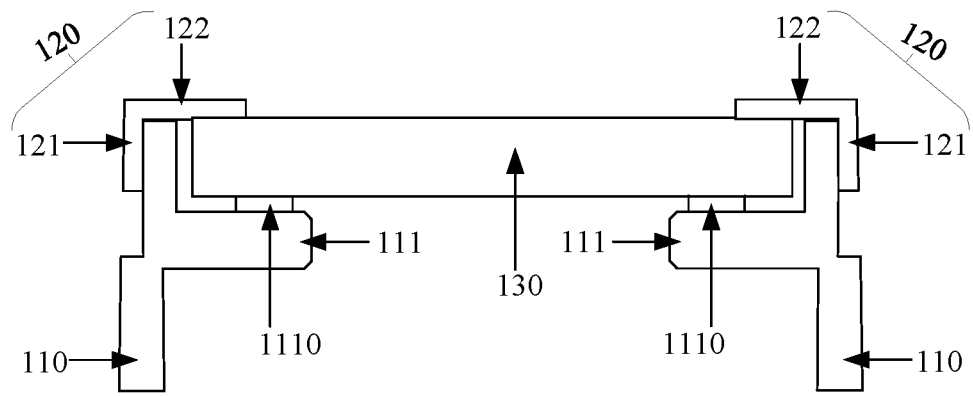
FIG. 1 is a schematic diagram of a partial structure of a backlight module frame according to an embodiment of the present disclosure.
Figure 2:
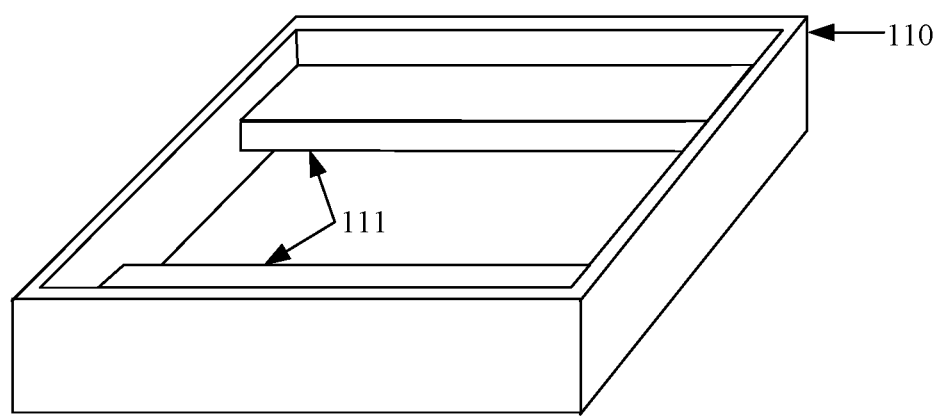
FIG. 2 is a schematic structural diagram of a middle frame according to an embodiment of the present disclosure.

FIG. 1 is a schematic diagram of a partial structure of a backlight module frame according to an embodiment of the present disclosure. The backlight module frame is a frame of the backlight module, and the backlight module may provide a light source for a first display panel 130. As shown in FIG. 1, the backlight module frame may include a middle frame 110 and a fixing member 120. FIG. 2 is a schematic structural diagram of a middle frame according to an embodiment of the present disclosure. It can be seen with reference to FIG. 2 that the middle frame 110 may be a hollow frame, and a display panel support stand 111 is disposed at the inner side of the middle frame 110. The display panel support stand 111 may support the first display panel 130.

The fixing member 120 is connected to the middle frame 110, and a display panel receiving slot is formed among the display panel support stand 111, the fixing member 120, and the middle frame 110.

In summary, the embodiment of the present disclosure provides the backlight module frame. The backlight module frame includes the middle frame and the fixing member. The middle frame is a hollow frame, and the inner side of the middle frame is provided with the display panel support stand. The display panel support stand is configured to support the first display panel. The backlight module frame further includes a fixing member connected to the middle frame. The display panel receiving slot is formed among the display panel support stand, the fixing member and the middle frame, so that the first display panel may be disposed in the display panel receiving slot. The first display panel may be fixed in the middle frame by the fixing member. Therefore, during the transportation, the backlight module frame can protect the first display panel, thereby preventing the display panel from being scratched, and ensuring the display effect of the display device.

As shown in FIG. 1, the fixing member 120 may include a first fixing portion 121 and a second fixing portion 122 connected to each other. The fixing member 120 is connected to the middle frame 110 by the first fixing portion 121. The fixing member 120 forms the display panel receiving slot with the display panel support stand 111 by the second fixing portion 122.

That is, the first fixing portion 121 may be fixed to the middle frame 110, the second fixing portion 122 and the support stand 111 are disposed oppositely, and the first display panel 130 may be disposed between the support stand 111 and the second fixing portion 122.

The fixing member includes the first fixing portion and the second fixing portion connected to each other, and the first fixing portion is configured to be fixed to the middle frame. The second fixing portion and the display panel support stand are disposed oppositely, and the first display panel is configured to be disposed between the display panel support stand and the second fixing portion. By disposing the fixing member in the backlight module, the fixing member can fix the first display panel in the middle frame. Therefore, during the transportation, the backlight module can protect the first display panel, thereby preventing the display panel from being scratched, and ensuring the display effect of the display device.

Optionally, referring to FIG. 1, a bonding structure 1110 is disposed on a surface of the display panel support stand 111 facing the second fixing portion 122. The bonding structure 1110 may be a foam double-sided adhesive tape, glue, or the like, which realizes the bonding of the display panel and the display panel support stand 111. The glue may be an optically clear resin (OCR) or an optically clear adhesive (OCA).

As shown in FIG. 2, the display panel support stand 111 may be formed by two support plates. The two support plates are respectively disposed by clinging to two opposite sides of the middle frame 110.

In other implementation manners, the display panel support stand 111 may also be formed by three or four support plates. The three or four support plates are respectively disposed by clinging to three or four adjacent sides of the middle frame 110.

In an implementation manner of the embodiment of the present disclosure, the first fixing portion 121 may be a plate-like structure, and the first fixing portion 121 may be connected to the outer side of the middle frame 110.

In another implementation manner of the embodiment of the present disclosure, the first fixing portion 121 may be a clamping leg, and the clamping leg may be connected to the middle frame 110 in a clamping manner.

The following describes the structures of the above two types of first fixing portions 121 and the connection manner with the middle frame 110 with reference to the accompanying drawings.

Figure 3:
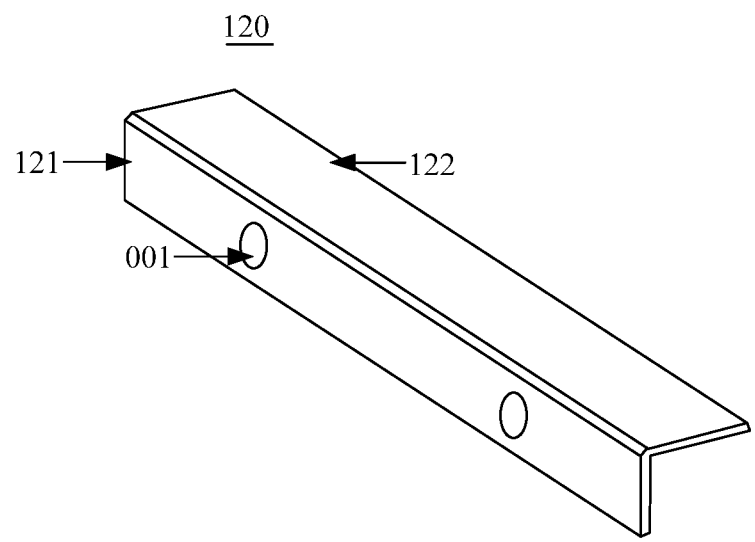
FIG. 3 is a schematic structural diagram of a fixing member according to an embodiment of the present disclosure.

FIG. 3 is a schematic structural diagram of a fixing member according to an embodiment of the present disclosure. As shown in FIG. 1 and FIG. 3, the first fixing portion 121 and the second fixing portion 122 may be both a plate-like structure. The first fixing portion 121 is perpendicular to the second fixing portion 122, and the second fixing portion 122 is parallel to the display panel support stand 111. The first fixing portion 121 is provided with a through hole 001, and the first fixing portion 121 may be fixed to the middle frame 110 by the through hole 001.

Figure 4:
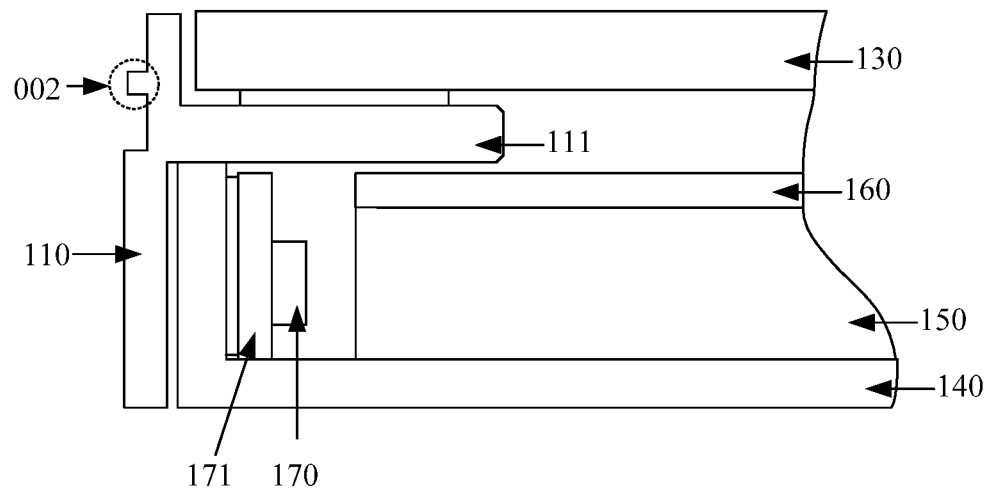
FIG. 4 is a schematic structural diagram of another middle frame according to an embodiment of the present disclosure.
Figure 5:
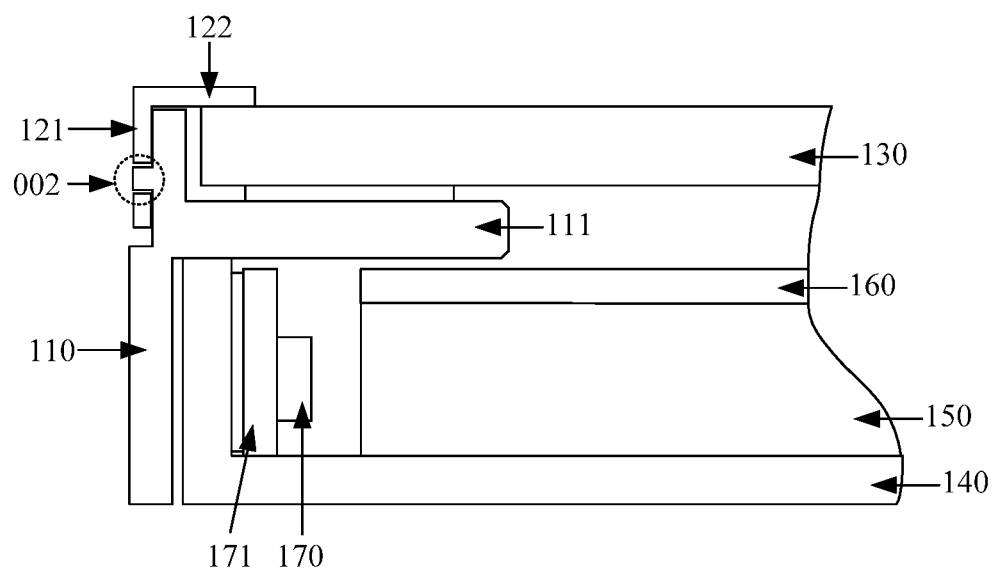
FIG. 5 is a schematic structural diagram of a backlight module according to an embodiment of the present disclosure.

In an optional implementation of the embodiment of the present disclosure, as shown in FIG. 4 (FIG. 4 only shows a part of the backlight module frame), a protrusion structure 002 may be disposed on the outer side of the middle frame 110. The protrusion direction of the protrusion structure 002 is perpendicular to the plate surface of the first fixing portion 121. Referring to FIG. 5, the protrusion structure 002 may be clamped into the through hole 001 (not labeled in FIG. 5) of the first fixing portion 121, so that the first fixing portion 121 may be fixedly connected to the middle frame 110.

As shown in FIG. 3 to FIG. 5, in the embodiment of the present application, the through hole 001 is a circular hole, and accordingly, the protrusion structure 002 is a cylindrical structure.

In other implementation manners, the through hole 001 may also be a hole of other shapes. Correspondingly, the protrusion structure 002 may also be a columnar structure having the same cross section as the shape of the through hole 001.

Figure 6:
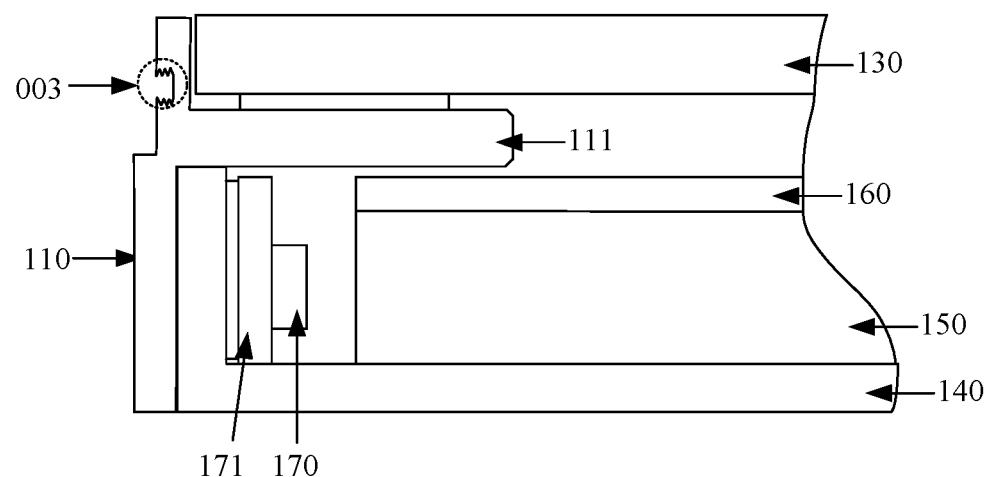
FIG. 6 is a schematic structural diagram of yet another middle frame according to an embodiment of the present disclosure.
Figure 7:
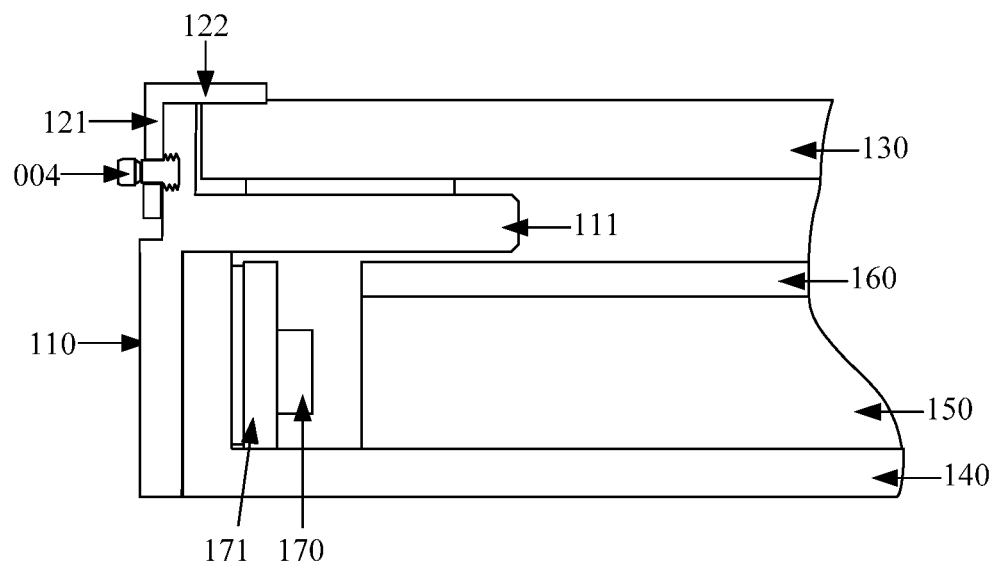
FIG. 7 is a schematic structural diagram of another backlight module according to an embodiment of the present disclosure.

In another optional implementation manner of the embodiment of the present disclosure, as shown in FIG. 6, a threaded hole 003 is disposed in the outer side of the middle frame 110, and the threaded hole 003 in the middle frame 110 and the through hole 001 in the first fixing portion 121 are in one-to-one correspondence. As shown in FIG. 7, the first fixing portion 121 may be fixed on the middle frame 110 by a bolt 004.

In such implementation manner, the through hole 001 in the first fixing portion 121 may be a threaded hole, or may be an unthreaded hole without threads, which is not limited in the embodiment of the present disclosure.

In the embodiment of the present disclosure, a plurality of through holes 001 may be disposed in the first fixing portion 121 to ensure the connection stability of the first fixing portion 121 and the middle frame 110. The plurality of through holes 001 may be disposed along a length direction of the first fixing portion 121. For example, as shown in FIG. 3, two through holes 011 may be disposed in the first fixing portion 121.

Figure 8:
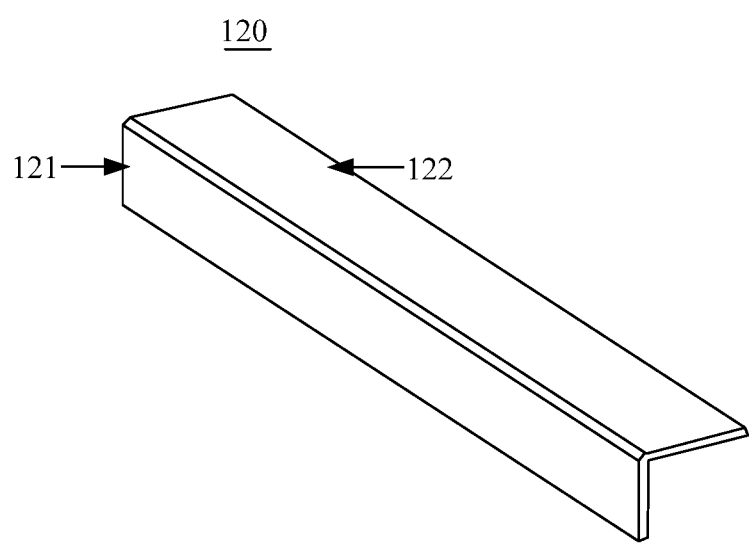
FIG. 8 is a schematic structural diagram of another fixing member according to an embodiment of the present disclosure.

FIG. 8 is a schematic structural diagram of another fixing member according to an embodiment of the present disclosure. As shown in FIG. 8, the first fixing portion 121 and the second fixing portion 122 may be both a plate-like structure. The first fixing portion 121 is perpendicular to the second fixing portion 122, and the second fixing portion 122 may be parallel to the display panel support stand 111. The first fixing portion 121 and the middle frame 110 may be adhesively fixed. Optionally, the first fixing portion 121 and the middle frame 110 may be bonded and fixed by an adhesive tape or glue.

Figure 9:
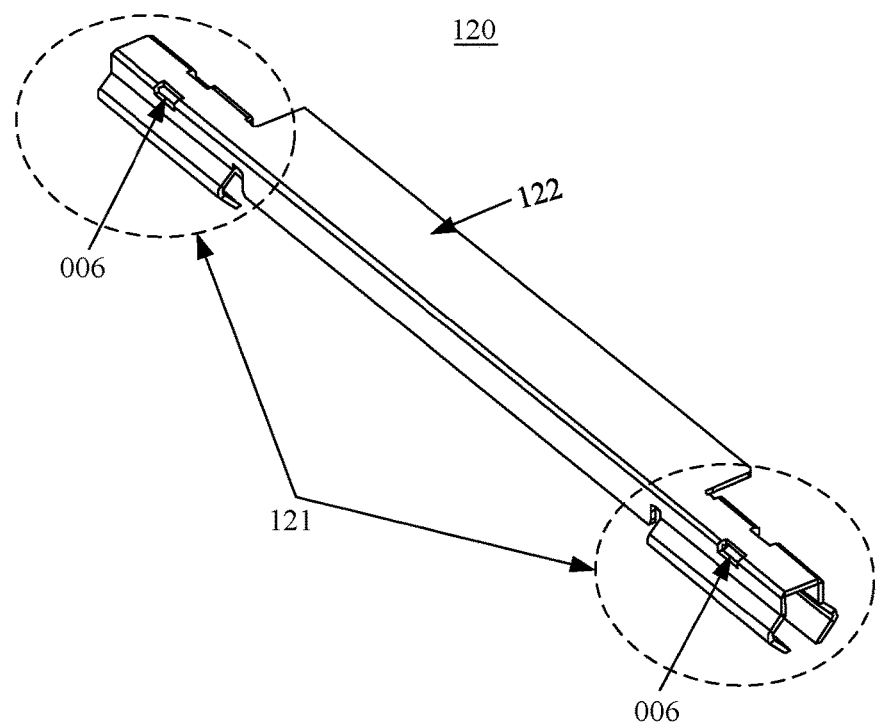
FIG. 9 is a schematic structural diagram of yet another fixing member according to an embodiment of the present disclosure.
Figure 10:
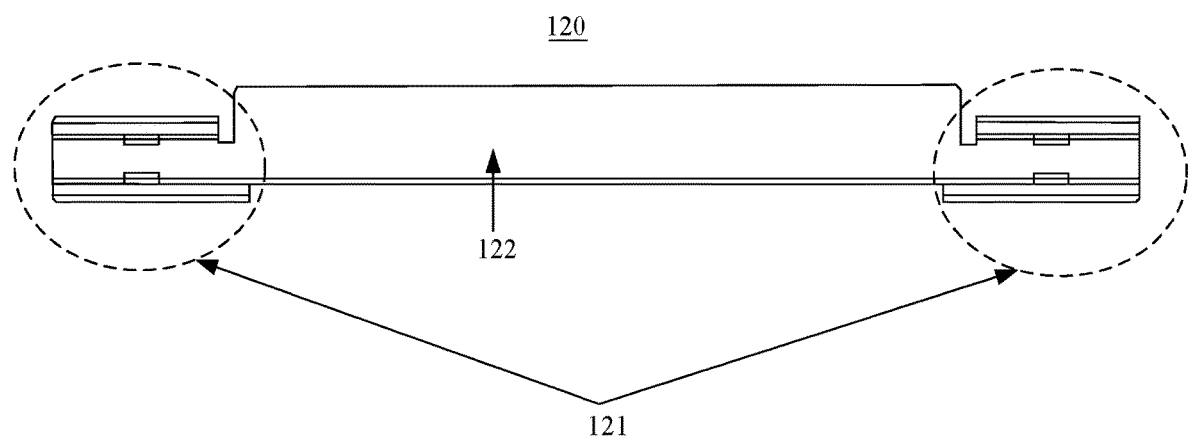
FIG. 10 is a top view of the fixing member shown in FIG. 9.

FIG. 9 is a schematic structural diagram of yet another fixing member according to an embodiment of the present disclosure, and FIG. 10 is a top view of the fixing member shown in FIG. 9. As shown in FIG. 9 and FIG. 10, the second fixing portion 122 may be a plate-like structure parallel to the display panel support stand 111, and the first fixing portion 121 may be a clamping leg.

Figure 11:
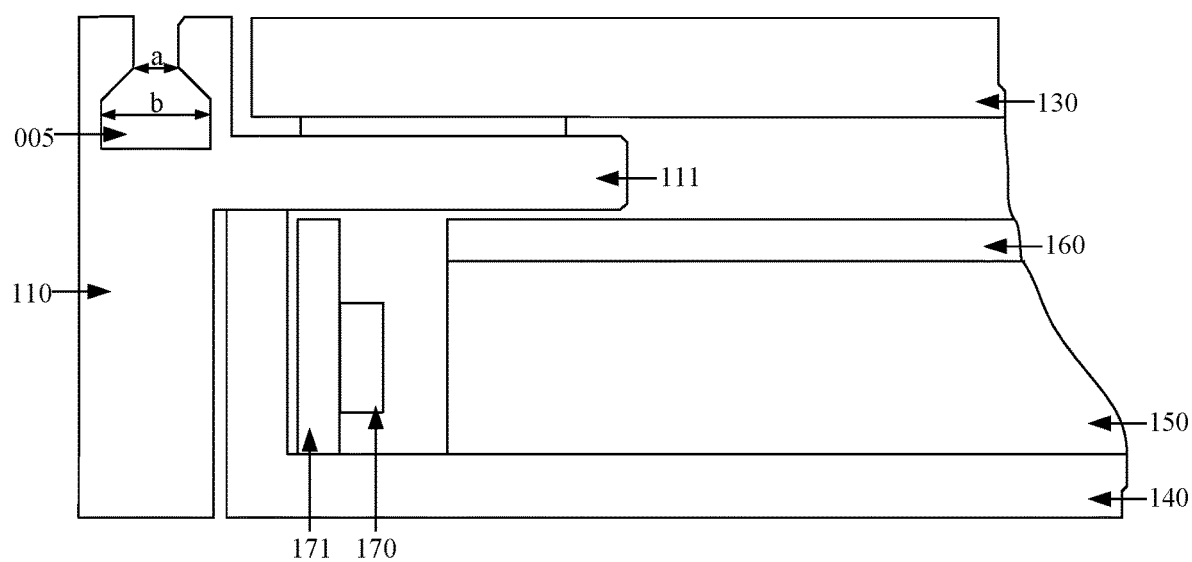
FIG. 11 is a schematic structural diagram of another middle frame according to an embodiment of the present disclosure.

FIG. 11 is a schematic structural diagram of another middle frame according to an embodiment of the present disclosure. As shown in FIG. 11, the middle frame 110 may be provided with a clamping slot 005, and the clamping leg 121 may be clamped in the clamping slot 005 so as to be fixed to the middle frame 110.

Figure 12:
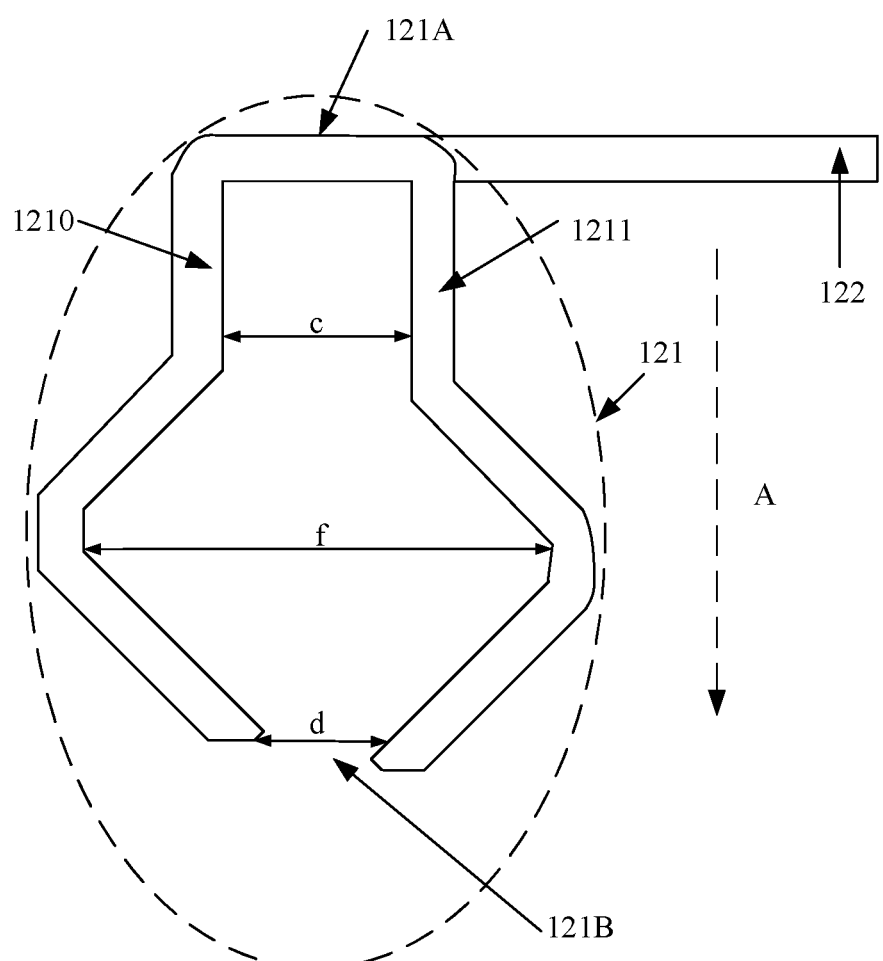
FIG. 12 is a side view of the fixing member shown in FIG. 9.
Figure 13:
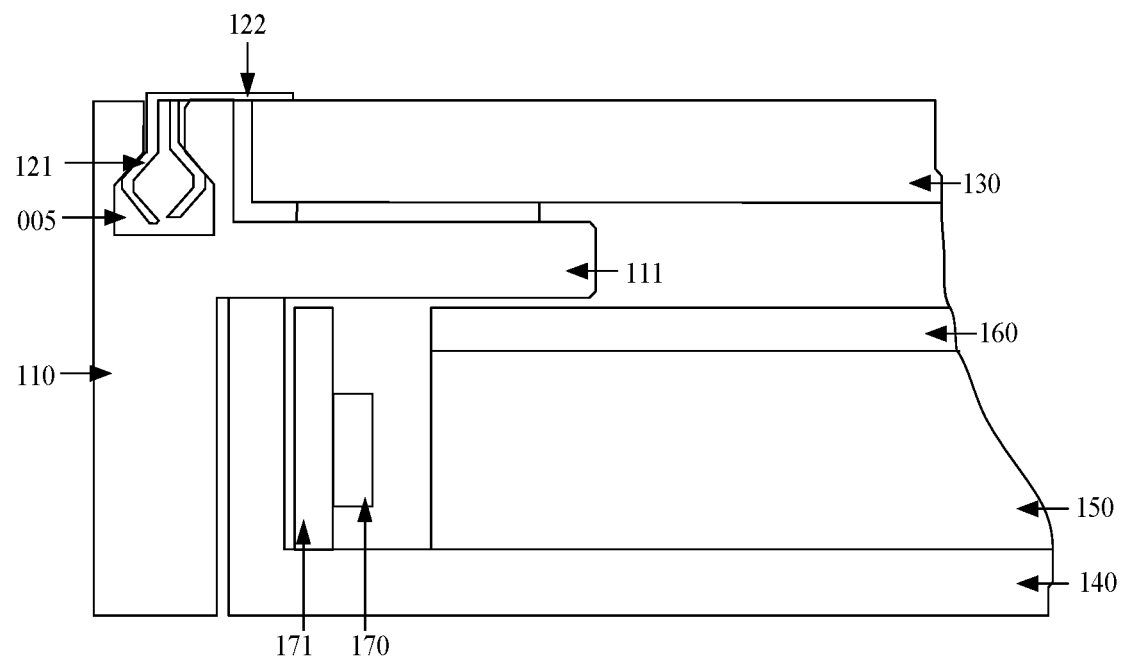
FIG. 13 is a schematic structural diagram of yet another backlight module according to an embodiment of the present disclosure.

Optionally, referring to FIG. 11, the upper end surface of at least one frame edge of the middle frame 110 is provided with the clamping slot 005, and the width a of the top portion of the clamping slot 005 is smaller than the width b of the bottom portion. FIG. 12 is a side view of the fixing member shown in FIG. 9. As shown in FIG. 12, the width c of the top portion and the width d of the bottom portion of the clamping leg 121 may be both smaller than the width f of the middle portion. FIG. 13 is a schematic structural diagram of yet another backlight module according to an embodiment of the present disclosure. As shown in FIG. 13, the clamping leg 121 may be clamped in the clamping slot 005. Since the width c of the top portion and the width d of the bottom portion of the clamping leg 121 are both smaller than the width f of the middle portion, the clamping leg 121 can be prevented from being detached from the clamping slot 005, thereby ensuring the connection stability of the first fixing portion 121 and the middle frame 110.

The upper end surface of the middle frame 110 may be a surface in contact with the second fixing portion 122. The clamping slot 005 and the top portion of the clamping leg 121 are close to such upper end surface with respect to the bottom portion. The width direction of the clamping slot 005 is perpendicular to the extending direction of the frame edge where the clamping slot 005 is located, and the width direction of the clamping leg 121 is parallel to the width direction of the clamping slot 005.

In the embodiment of the present disclosure, the length direction of the second fixing portion 122 may be parallel to an extending direction of the frame edge where the clamping slot 005 is located. Referring to FIG. 9 and FIG. 10, the fixing member 120 may include two first fixing portions 121. The two first fixing portions 121 are disposed at both ends of the second fixing portion 122, and a connection line direction between the two first fixing portions 121 is parallel to the length direction of the second fixing portion 122. Each first fixing portion 121 may include a first fixing piece 1210 and a second fixing piece 1211 which are disposed oppositely, and the shapes of the two fixing pieces may be the same. Referring to FIG. 12, the distance between the first fixing piece 1210 and the second fixing piece 1211 increases at first and then decreases along a first direction A. The first direction A is from a first end 121A to a second end 121B of the first fixing portion 121. The first end 121A is an end of the first fixing portion 121 in contact with the second fixing portion 122, and the second end 121B is another end of the first fixing portion 121.

For example, referring to FIG. 9, each fixing piece may be a bent plate-like structure. Optionally, the distance between the bottom end of the first fixing piece 1210 and the bottom end of the second fixing piece 1211 may be smaller than the width a of the top portion of the clamping slot 005, so that the clamping leg may be conveniently clamped in the clamping slot 005.

As shown in FIG. 9, each first fixing portion 121 may be further provided with a through hole 006, and the bent plate-like structure may be easily processed by disposing the through hole 006. Optionally, the first fixing piece 1210 and the second fixing piece 1211 may be an integrated structure. The first fixing portion 121 and the second fixing portion 122 may also be an integrated structure.

Figure 14:
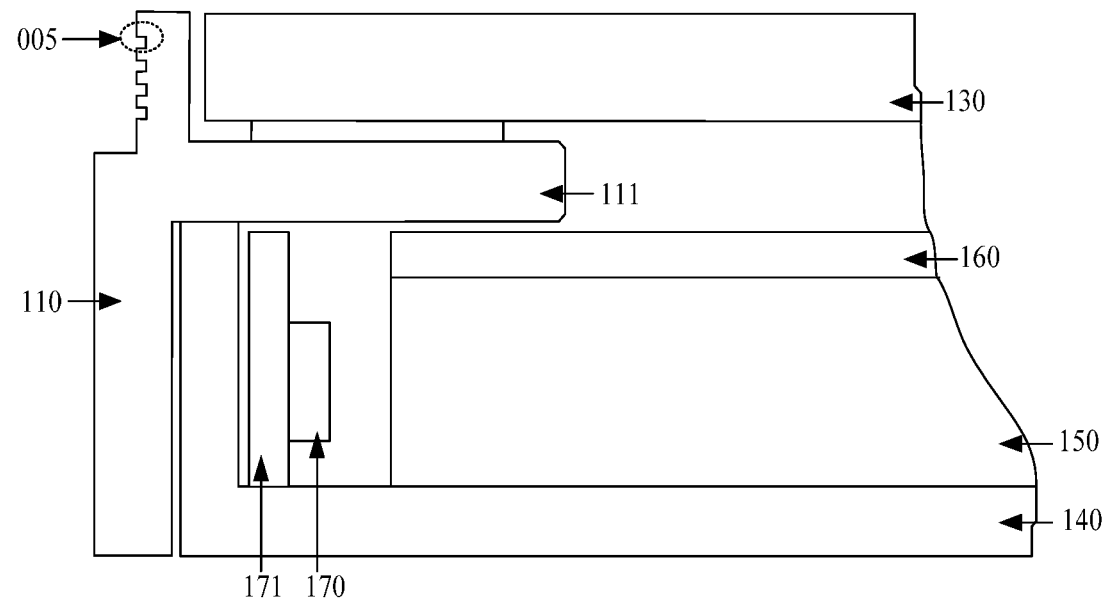
FIG. 14 is a schematic structural diagram of yet another middle frame according to an embodiment of the present disclosure.
Figure 15:
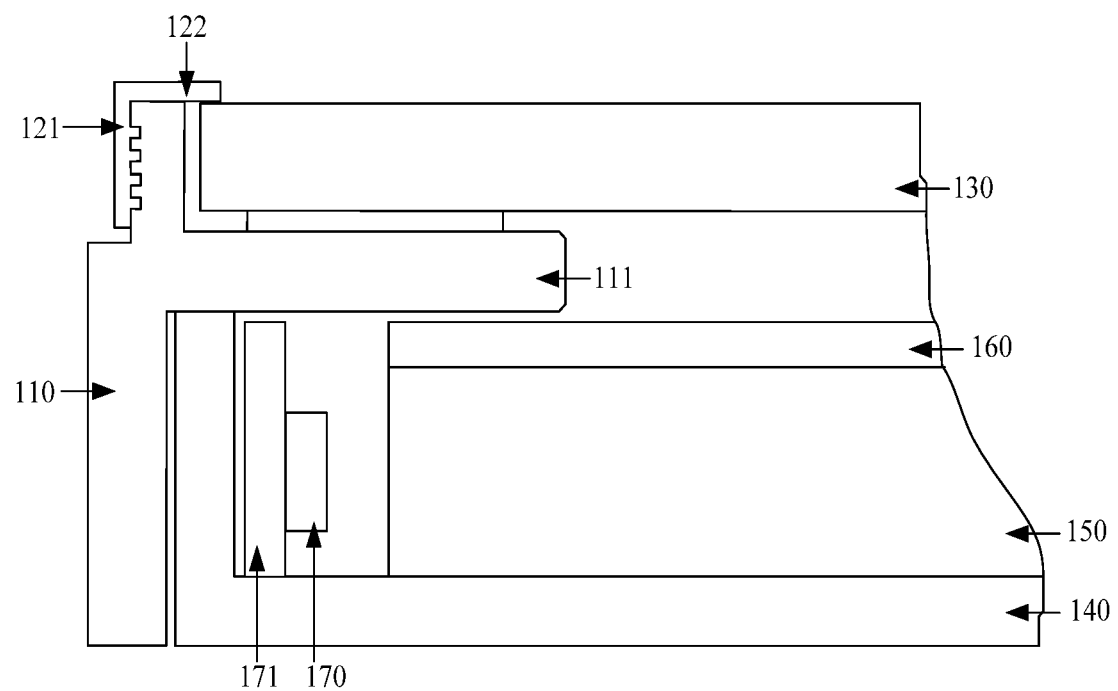
FIG. 15 is a schematic structural diagram of another backlight module according to an embodiment of the present disclosure.

FIG. 14 is a schematic structural diagram of another middle frame according to an embodiment of the present disclosure. As shown in FIG. 14, a plurality of clamping slots 005 may be disposed in the outer side of the middle frame 110, and each clamping slot 005 may be a groove. The recessed direction of the groove is perpendicular to the plate surface of the first fixing portion 121. The clamping legs 121 may be a plurality of protrusion structures in one-to-one correspondence with the clamping slots 005 in the middle frame 110. As shown in FIG. 15, the plurality of protrusion structures may be clamped into the corresponding grooves so as to be fixed to the middle frame 110.

The backlight module frame provided by the embodiment of the present disclosure may include a plurality of fixing members 120, and the plurality of fixing members 120 may be disposed on the middle frame 110 in a surrounding manner. By disposing the plurality of fixing members 120 on the middle frame 110 in a surrounding manner, the fixing reliability of the first display panel 130 may be improved.

Optionally, the fixing member 120 may be made of an injection-molded material or a stainless-steel metal material. If the fixing member 120 is made of the injection-molded material, the thickness of the second fixing portion 122 is greater than 0.5 mm (millimeter). For example, the injection-molded material may be a polycarbonate material. If the fixing member 120 is made of the stainless-steel metal material, the thickness of the second fixing portion may be 0.15 mm. For example, the stainless-steel metal material may be the SUS301 material. The thickness direction of the second fixing portion 122 is perpendicular to the support surface of the display panel support stand 111.

The embodiment of the present disclosure provides a backlight module. The backlight module includes the backlight module frame as described above. Referring to FIG. 5, FIG. 7, FIG. 13 and FIG. 15, the backlight module may further include a back plate 140, a light guide plate 150, an optical film 160 and a light source 170. The light source 170, the light guide plate 150, and the optical film 160 are all disposed on the back plate 140, and are all located on a side of the display panel support stand 111 of the middle frame 110 away from the first display panel 130. The back plate 140 is located at the bottom of the middle frame 110. The light guide plate 150 is located on the back plate 140. The optical film 160 is located on a side of the light guide plate 150 away from the back plate 140, and is located on a side of the display panel support stand 111 away from the first display panel 130. The light source 170 is located on the side surface of the light guide plate 150. The light source 170 may be a light emitting diode (LED) disposed on a circuit board 171. For example, the light source 170 may be soldered on the circuit board 171 by soldering. The optical film 160 may include at least one of a polarizer, a diffusion sheet, and a prism film.

Figure 16:
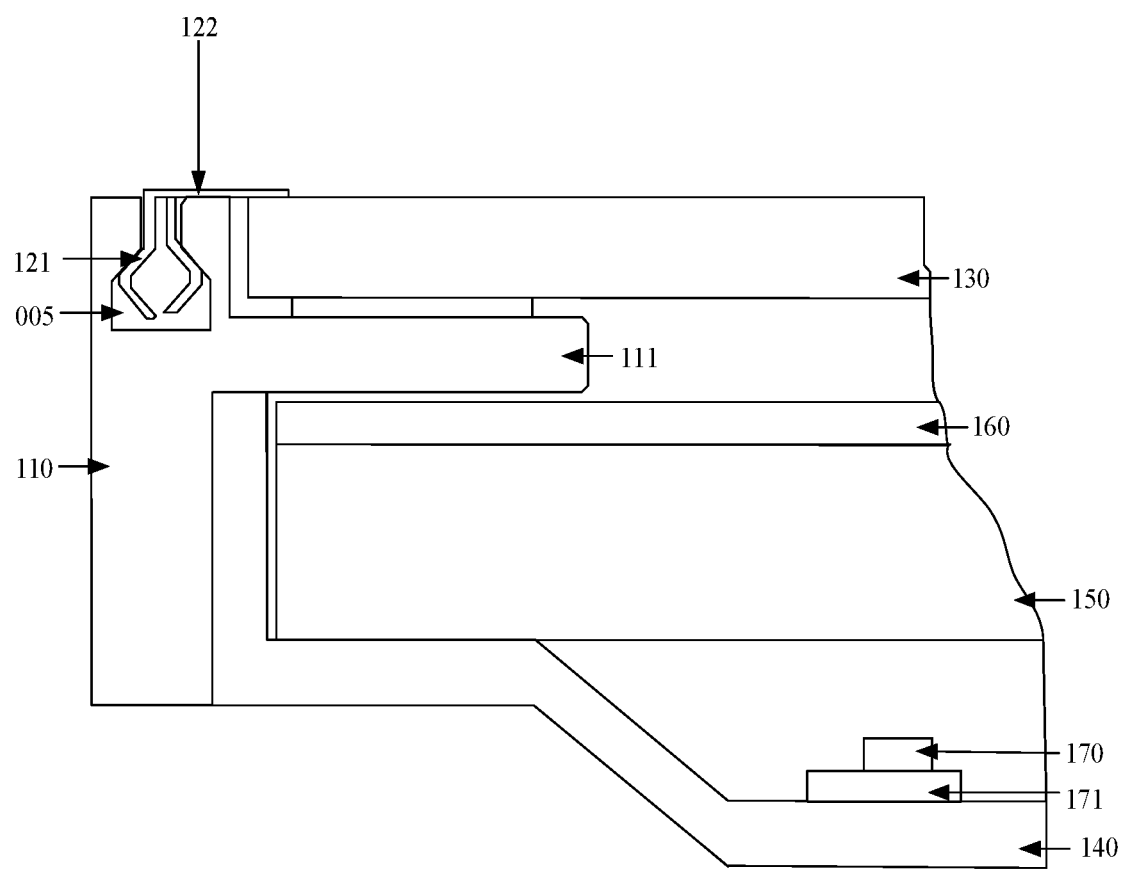
FIG. 16 is a schematic structural diagram of yet another backlight module according to an embodiment of the present disclosure.

In the embodiment of the present disclosure, the backlight module may be divided into a side-lit type backlight module and a direct-lit type backlight module according to different orientations of the light source 170. As shown in FIG. 5, the light source 170 in the side-lit type backlight module is disposed on the side surface of the light guide plate 150. As shown in FIG. 16, the light source 170 in the direct-lit type backlight module is located at the bottom of the light guide plate 150, that is, a side of the light guide plate 150 away from the optical film 160.

In summary, the embodiment of the present disclosure provides a backlight module. The backlight module includes the middle frame and the fixing member, and the middle frame is a hollow frame. The display panel support stand is disposed on the inner side of the middle frame. The display panel support stand is configured to support the first display panel. The fixing member includes the first fixing portion and the second fixing portion connected to each other. The first fixing portion is configured to be fixed to the middle frame, and the second fixing portion and the display panel support stand are disposed oppositely. The first display panel is configured to be disposed between the display panel support stand and the second fixing portion. By disposing the fixing member in the backlight module, the fixing member can fix the first display panel in the middle frame. Therefore, during the transportation, the backlight module can protect the first display panel, thereby preventing the display panel from being scratched, and ensuring the display effect of the display device.

The embodiment of the present disclosure provides a display module. The display module may include a first display panel 130 and a backlight module. The backlight module may be the backlight module as shown in FIG. 1, FIG. 5, FIG. 7, FIG. 13, FIG. 15 or FIG. 16. It can be known with reference to the above drawings that the backlight module may include the middle frame 110 and the fixing member 120. The middle frame 110 is a hollow frame, and the display panel support stand 111 is disposed at the inner side of the middle frame 110. The fixing member 120 includes the first fixing portion 121 and the second fixing portion 122 connected to each other. The first display panel 130 is disposed between the display panel support stand 111 and the second fixing portion 122 in the fixing member 120.

Optionally, the first display panel 130 may be bonded to the display panel support stand 111 by a foam double-sided adhesive tape, or may be bonded to the display panel support stand 111 by glue. The glue may be OCR or OCA.

Figure 17:
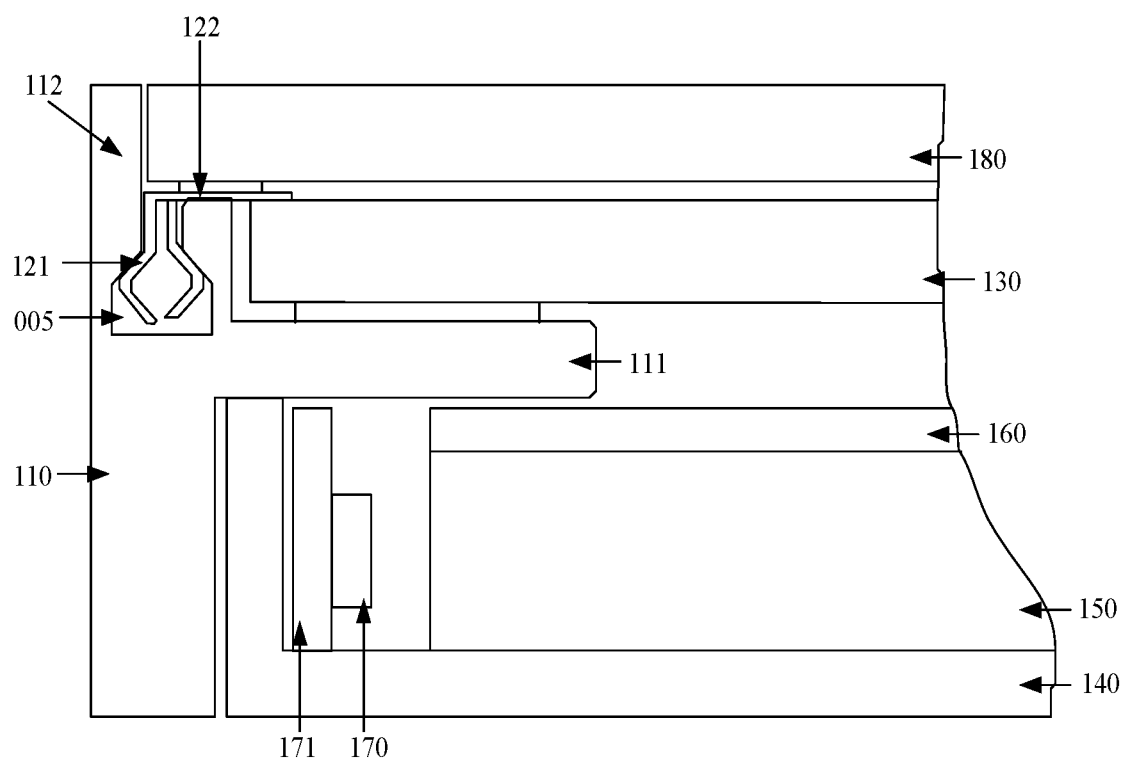
FIG. 17 is a schematic structural diagram of a display device according to an embodiment of the present disclosure.

The embodiment of the present disclosure further provides a display device. As shown in FIG. 17, the display device may include a second display panel 180 and a display module. The second display panel 180 is disposed on a side of the first display panel 130 away from the backlight module. The second display panel 180 and the first display panel 130 may be bonded by a foam double-sided adhesive tape, or may be bonded by glue. The foam double-sided adhesive tape may be disposed around a side of the first display panel 130 close to the second display panel 180. The display device may be any product or component with a display function, such as a liquid crystal panel, electronic paper, a mobile phone, a tablet computer, a television, a display, a notebook computer, a digital photo frame or a navigator.

As shown in FIG. 17, when the clamping slot 005 is disposed in the upper end surface of the middle frame 110 to be connected to the first fixing portion 121, since there is no need to connect the first fixing portion 121 to the outer side of the middle frame 110, a circle of protrusions 112 may also be disposed along the outer side of the middle frame 110, and the protrusions 112 and the first display panel 130 form a groove for placing the second display panel 180, thereby facilitating the assembly of the second display panel 180.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A backlight module frame, comprising: a middle frame and at least one fixing member; wherein
    the middle frame includes a frame edge, an inner surface of the frame edge defines an internal space, and a display panel support stand is located in the internal space;
    each fixing member is connected to the frame edge, and a display panel receiving slot is formed by the display panel support stand, the fixing member, and the middle frame;
    wherein the fixing member comprises a first fixing portion and a second fixing portion connected to each other, the first fixing portion is a clamping leg which is located between the inner surface and an outer surface of the frame edge, is connected to the frame edge in a clamping manner and is non-contact with the inner surface and the outer surface of the frame edge, and a length direction of the second fixing portion is parallel to an extending direction of the frame edge to which the clamping leg is connected.

2. The backlight module frame according to claim 1, wherein the first fixing portion is connected to the middle frame; and the display panel receiving slot is between the display panel support stand and the second fixing portion.

3. The backlight module frame according to claim 1, wherein the upper end surface of at least one frame edge of the middle frame is provided with a clamping slot, and the clamping leg is clamped in the clamping slot;
    wherein the upper end surface of the middle frame is a surface of the middle frame in contact with the second fixing portion.

4. The backlight module frame according to claim 3, wherein a width of a top portion of the clamping slot is smaller than a width of a bottom portion of the clamping slot;
    a width of a top portion and a width of a bottom portion of the clamping leg are both smaller than a width of a middle portion of the clamping leg;
    wherein, the top portion is close to the upper end surface with respect to the bottom portion, a width direction of the clamping slot is perpendicular to an extending direction of the frame edge where the clamping slot is, and a width direction of the clamping leg is parallel to the width direction of the clamping slot.

5. The backlight module frame according to claim 1, wherein the fixing member comprises two first fixing portions and the two first fixing portions are at an interval.

6. The backlight module frame according to claim 1, wherein the first fixing portion comprises a first fixing piece and a second fixing piece which are opposite to each other;
    the distance between the first fixing piece and the second fixing piece increases at first and then decreases along a first direction, the first direction is from a first end to a second end of the first fixing portion, the first end is an end of the first fixing portion in contact with the second fixing portion, and the second end is another end of the first fixing portion.

7. The backlight module frame according to claim 2, wherein the second fixing portion is a plate-like structure, and the second fixing portion is in parallel with the display panel support stand.

8. The backlight module frame according to claim 2, wherein a bonding structure is on the display panel support stand, and the bonding structure is on a surface of the display panel support stand facing the second fixing portion.

9. The backlight module frame according to claim 1, wherein the backlight module frame comprises: a plurality of fixing members, and the plurality of fixing members are on the middle frame in a surrounding manner.

10. The backlight module frame according to claim 1, wherein the fixing member is made of an injection-molded material or a stainless-steel metal material.

11. A backlight module, comprising the backlight module frame according claim 1, wherein
    the backlight module further comprises: a back plate, a light guide plate, an optical film, and a light source;
    the light source, the light guide plate, and the optical film are on the back plate, and are on a side of the display panel support stand of the middle frame facing away from the display panel receiving slot.

12. A display module, comprising a first display panel and the backlight module according to claim 11, wherein the backlight module comprises a middle frame and a fixing member; and
    the first display panel is in a display panel receiving slot between the display panel support stand and the fixing member.

13. A display device, comprising: a second display panel and the display module according to claim 12, wherein
    the second display panel is on a side of the first display panel away from the backlight module.

14. The display device according to claim 13, wherein the fixing member comprises a first fixing portion and a second fixing portion connected to each other, and the first fixing portion is connected to the middle frame; and the display panel receiving slot is between the display panel support stand and the second fixing portion.

15. The backlight module frame according to claim 1, wherein protrusions are disposed along an outer side of the middle frame, and a groove for accommodating a second display panel is formed by the protrusions and a first display panel, and the first display panel is received in the display panel receiving slot.

16. The backlight module frame according to claim 1, wherein the first fixing portion is provided a through hole, for facilitating the processing gf the clamping leg.

17. The backlight module frame according to claim 5, wherein the two first fixing portions are at both ends of the second fixing portion, and a direction along a line connecting the two first fixing portions is parallel to the length direction of the second fixing portion.

\* \* \* \* \*